Sept. 11, 1951    C. H. SCHETZER    2,567,529
ACCELERATOR PEDAL REST
Filed March 31, 1950
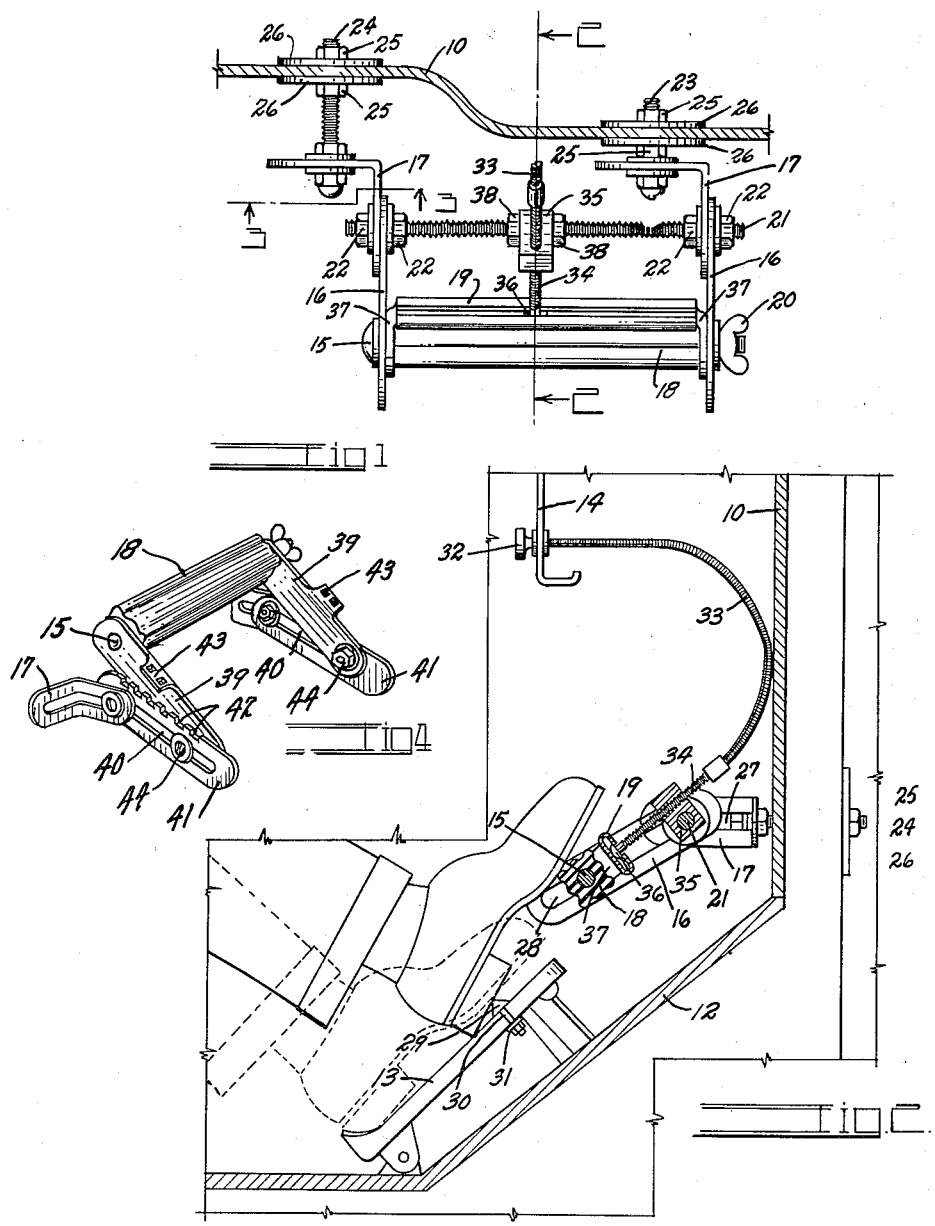
INVENTOR.
CHARLES H. SCHETZER
BY
ATTORNEY Patented Sept. 11, 1951

2,567,529

UNITED STATES PATENT OFFICE 2,567,529

ACCELERATOR PEDAL REST

Charles H. Schetzer, Goodland, Kans.

Application March 31, 1950, Serial No. 153,129

3 Claims. (Cl. 74—564)

This invention relates to a rest for the accelerator foot of an automobile driver. On long drives, and especially in trucking, it is necessary to maintain a continuous speed for long periods. This constant holding of the accelerator with the toe is exceedingly tiresome on the foot and leg muscles of the driver.

The principal object of this invention is to provide means for supporting the driver's foot, which will allow the foot to be shifted, so that the heel of the foot may be used to depress the accelerator pedal so as to relieve the muscular strain on the leg muscles.

A further object is to so construct the device that its position may be changed and adjusted from the instrument board of the vehicle, to obtain the most restful and efficient driving position.

A further object is to provide mounting means for the foot rest, which would be adaptable to cars and trucks of various makes and design.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved accelerator pedal foot rest in place on an automotive vehicle;

Fig. 2 is a cross section taken on the line 2—2, Fig. 1, showing side view of the improved rest; and Fig. 3 is a detail section taken on the line 3—3, Fig. 1; and Fig. 4 is a perspective view illustrating an alternate means for mounting the improved foot rest.

In the drawing various parts of an automotive vehicle are designated by numerals as follows: Motor wall 10, floor boards 12, accelerator pedal 13, and instrument board 14.

The improved foot rest comprises a foot rest rod 15, extending between two slotted links 16, supported from angle brackets 17. The foot rest rod 15 carries a rectangular rubber cushion 18 and a channel member 19. The channel member 19 is provided with ears 37 through which the rod 15 passes. The rod 15 is threaded to receive a wing nut 20, which acts to clamp the ears 37, the links 16 and the cushion 18 in place on the rod 15.

The links 16 are attached to the angle brackets 17 through the medium of a threaded rod 21, which extends through the links 16 and through the brackets 17 at its extremities. The link 16 and the bracket 17, at each extremity of the rod 21, are clamped together by means of clamp nuts 22.

The angle brackets 17 are secured to the motor wall 10 by means of suitable clamp bolts 23 and 24, provided with clamping nuts 25 and clamping washers 26. In most automotive vehicles, the motor wall 10 bulges rearwardly at its middle over the fly wheel housing of the motor. To accommodate this, the bolt 24 is made longer than the bolt 23 so that the former will support its bracket 17 rearwardly from the wall 10, as shown in Fig. 1.

It will be noted that the angle brackets 17 are slotted throughout their lengths, as shown at 27, to allow the positions of the bolts 23 and 24 and the position of the threaded rod 21 to be varied for adjustment purposes. It will also be noted that the links 16 are slotted, as shown at 28, to allow the position of the rod 15 and the positions of the links 16 to be adjusted.

The heel of the driver's shoe is supported on a triangular heel rest 29, which is clamped to the accelerator pedal 13 by means of suitable clamp screws 30, which are placed at each side of the pedal 13 and extend through a cross bar 31 below the pedal. The ball of the foot rests against the heel rest 29 when driving with the toe, as shown in broken line in Fig. 2, and the heel of the driver's shoe is rested on the heel rest 29, with the ball of the foot resting on the cushion 18, when driving with the heel of the foot.

It is essential that the rubber cushion 18 be positioned at exactly the proper position and at the proper angle beneath the ball of the foot in order to relieve all muscular strain. An adjustment is provided to accurately ascertain and maintain "proper position," operable from a rotatable adjusting nob 32 mounted below the instrument board 14. A flexible shaft 33 extends from the nob 32 to an adjusting screw 34. The adjusting screw 34 is threaded through a nut block 35, which is slidably mounted on the threaded rod 21. The screw 34 terminates in a round enlarged head 36, which is longitudinally movable in the channel member 19.

It can be readily seen that if the nob 32 is rotated in one direction, it will rotate the screw 34 so as to force the cushion 18 rearwardly and when rotated in the other direction it will rotate the screw 34 to pull the cushion 18 forwardly. It will also be noted that the block 35 can be adjusted lengthwise of the threaded rod 21 so as to force either desired extremity of the cushion 18 forward or rearward to provide an angular adjustment to align the cushion 18 with the sole of the driver's shoe. After the longitudinal adjustment is made, the block 35 can be locked in position on the rod 21 by means of lock nuts 38 and after the most satisfactory position has been found the wing nut 20 can be tightened to hold the rod 15 in its final adjustment.

In Fig. 4, an alternate means of adjusting and holding the foot rest is illustrated. In this means, the foot rest rod 15 and the cushion 18 are secured between the extremities of two lever links 39 which are hinged at their other extremities upon hinge bolts 44 which travel in slots 40 in a pair of link brackets 41. The link brackets 41 are secured to the angle brackets 17 as in the preceding form and are notched, as shown at 42, along their upper edges. The lever links are provided with perforated flange members 43 adapted to be received in the notches 42. Thus, the cushion member can be lifted to release the flange members 43 from the notches 42, as shown in Fig. 4, and can then be shifted forward and back until the desired position is reached. The device can then be locked in position by simply folding the flange members 43 back into the notches 42.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A foot rest for the accelerator pedals of automotive vehicles comprising: a supporting structure; means adapted for mounting said structure above an accelerator pedal; a foot rest rod movably supported by said structure; a U-shaped frame secured at its two extremities to the two extremities of said rod; a rotatable adjusting screw extending from said U-shaped frame; a nut member threaded on said screw; means supporting said nut member from said supporting structure; and means for rotating said screw and causing said U-shaped frame to move said foot rest rod toward and away from said accelerator pedal.

2. A foot rest for the accelerator pedals of automotive vehicles comprising: a supporting structure; means adapted for mounting said structure above an accelerator pedal; a foot rest rod movably supported by said structure; a U-shaped frame secured at its two extremities to the two extremities of said rod; a rotatable adjusting screw extending from said U-shaped frame; movable mounting means mounting said screw on said U-shaped frame so that it may be moved parallel to the axis of said rod; a threaded rod supported by said supporting structure and extending parallel to said axis; a nut member mounted on said threaded rod so as to be movable therealong, said screw being threaded through said nut member at right angles to said rods; and means for rotating said screw to cause said foot rest rod to move toward and away from said accelerator pedal.

3. A foot rest for automotive vehicles comprising: two angle brackets; means for securing said brackets to said vehicle; a slotted link member extending from each bracket; an elongated foot rest member positioned between said links; a foot rest rod extending between said links and through said rest member; a channel member extending between said links parallel to said foot rest rod; an ear formed upon each extremity of said channel member, each of said ears being connected to said rod between said rest member and one of said links; a threaded rod extending between said links parallel to said rest rod; a nut block threaded on said threaded rod; a screw slidably mounted in said channel member and projecting therefrom and being threaded through said nut block at right angles to said threaded shaft; means for rotating said screw to raise and lower said rest rod in said slotted links; and means on said rest rod clamping the latter in any desired position in said links.

CHARLES H. SCHETZER.

REFERENCES CITED

The following references are of record in the file of this patent:

UNITED STATES PATENTS

| Number | Name | Date |
|---|---|---|
| 1,233,249 | Koken | July 10, 1917 |
| 2,138,242 | Nan | Nov. 29, 1938 |
| 2,284,683 | Preussler | June 2, 1942 |